United States Patent Office 2,849,406
Patented Aug. 26, 1958

2,849,406

REACTIVATION OF HYDROFORMING CATALYST

Trent Lane, Baton Rouge, La., assignor to Esso Research and Engineering Company, a corporation of Delaware No Drawing. Application May 1, 1953
Serial No. 352,597

3 Claims. (Cl. 252—413)

The present invention relates to improvements in catalyst reactivation. More particularly, it relates to improvements in the reactivation of platinum type catalysts which have been found to deactivate so as to be unusable, or which have suffered a distinct loss of activity in the processes for which their utility is indicated.

For example, it is a matter of record and commercial practice to hydroform naphthas in the presence of a platinum catalyst. This platinum catalyst is usually supported on a suitable base, such as alumina, and may also contain a small amount of promoters or stabilizers such as boria, phosphoric anhydride, silica, or halogen acids. For instance, a commonly used composition of such catalyst is one containing from 0.01 to 2.0 weight percent platinum, the remainder being the alumina spacing agent or base. In place of alumina, other bases having mild cracking activity are used. In this hydroforming operation, virgin naphtha is contacted at elevated temperatures and pressures with the catalyst in the presence of added hydrogen. The function of the hydrogen is to repress the formation of carbonaceous deposits on the catalyst.

The operating conditions of the hydroforming operation are pressures in the range of 50 to 1000 p. s. i. g., usually 100 to 500 p. s. i. g., and temperatures in the range of 700°–1100° F., usually 875°–950° F. The hydrogen dilution may vary from about 1000 to 10,000 C. F./B.

The feed or charging stock to the hydroforming reactor can be a virgin naphtha, a cracked naphtha, a Fischer-Tropsch naphtha or the like. The feed stock is preheated alone or in admixture with recycle gas to reaction temperature or to the maximum temperature possible while avoiding thermal degradation of the feed stock.

These platinum catalysts have been found to deactivate with usage for various reasons, among which are changes in the physical state of the platinum. Important factors in the latter, for example, are the increased size of the platinum crystals and the rate of platinum crystal growth. Contaminants such as other heavy metals also tend to deactivate the catalyst. The deactivation resulting from these factors should be distinguished from the simpler, more easily reversible loss of activity of the catalyst due to carbonization.

Changes in the platinum crystal lattice also account to a certain extent for catalyst deactivation. Although these changes are reversible under certain conditions of operation, the severe treatment required to alter the lattice eventually leads to an agglomeration of platinum crystallites which is apparently an irreversible process. Normally, therefore, "spent" platinum catalysts are processed for the separation and recovery of the platinum which is then used to prepare fresh catalyst. This is, of course, an expensive operation, not only because of platinum recovery charges and cost for manufacturing new catalyst, but also because of the complete destruction of the expensive support which is inherent in a quantitative platinum recovery operation.

It has now been found that these expensive recovery operations can be completely eliminated by the reactivation process of this invention. The process comprises treating the deactivated supported catalyst with nitric acid, followed by, or simultaneously contacting the thus-treated catalyst with an aqueous hydrogen halide acid. The thus-treated catalyst is then dried and reduced, and the catalyst is completely reactivated so that it can be utilized again in a catalyzed reaction system such as hydroforming.

The hydrogen halide acids include HCl, HF, HI and HBr. Because of cost and other considerations, HCl is preferred.

Conveniently the nitric acid can be utilized in concentrations of 0.5 to 30 weight percent based on catalyst on a dry basis in the hydrogen halide acid-water mixture, while the hydrogen halide acid can be utilized in concentrations of 0.5 to 20 weight percent based on the catalyst on a dry basis in the nitric acid-water mixture. While the treatment with nitric acid can precede that with the HCl, it is preferable to utilize both together. The mixture is heated at a temperature below that at which the HCl and $HNO_3$ are completely driven off. The pressures and temperatures and times are accordingly adjusted. Conveniently the heating is done up to a temperature of about 200° F. at atmospheric pressure. A gas phase treatment can be employed at higher temperatures. Excess water and acid are then removed from the catalyst, conveniently by elevating the temperature until the catalyst is dry.

The final step in the activation involves the subjection of the dried catalyst to a reduction step. This reducing step can be carried out by means known in the art, such as hydrogenation, calcination, and treatment with chemical reducing agents. Typical of these reduction operations is treatment with hydrogen at 400°–1000° F. with hydrogenation pressures of atmospheric to 1000 pounds p. s. i. g. Calcining can be carried out at temperatures of the order of about 1100° F., e. g., 800°–1200° F. An advantage of the process of this invention is that the catalyst can be subjected to the reducing step directly in processes for which its use is contemplated, e. g., in hydroforming.

In some cases it may be desirable to minimize the amount of halide retained by the support. The halide can be removed by treating the catalyst by methods known in the art, such as by water washing, steaming, or treatment with ammonia. These washing steps conveniently can be carried out at any time after the halide contacting step. If the washing step takes place before the reduction step detailed above, it can be desirable to first convert the platinum to the insoluble sulfide. The reduction step would then follow in the same manner as taught above. Otherwise it is desirable to conduct the washing step after the reduction step. This washing can then be followed by another drying step.

This invention will be better understood by reference to the following examples of the reactivation of a deactivated platinum catalyst.

*Example I*

A ten gram sample of deactivated platinum catalyst containing 0.5 weight percent platinum on H–41 $Al_2O_3$ (a gel type alumina manufactured by the Aluminum Company of America) was examined under X-ray and found to contain crystallites of 200 A. or larger, synonymous with loss of activity for hydroforming operations. This deactivated catalyst was treated with nitric acid and hydrochloric acid present in 70 ml., or about 7 ml. per gram of catalyst, of an aqueous solution of about 5.6 M HNO₃ and 4.2 M HCl. The total aqueous mixture thus consisted on a weight percent basis of

| | Weight percent |
|---|---|
| HNO₃ | 29 |
| HCl | 13 |
| H₂O | 58 |
| | 100 |

The mixture was heated at a temperature of about 200° F. for about 30 minutes, after which it was evaporated to dryness. The supported catalyst was then reduced by calcining for six hours at 1050° F.

The catalyst treated by the process of this invention on subsequent X-ray analysis had platinum crystallites of less than 50 A. This marked reduction in size of platinum crystallites has been demonstrated experimentally to be synonymous with a restoration of activity and selectivity for various purposes, e. g., hydroforming.

The process of this invention is adapted to regenerate platinum catalysts on various types of supports. These supports include alumina or alumina containing silica, boria, zinc oxide, zirconia, titania, and thoria. The support can also be composed entirely of other materials or combinations of materials, such as zirconia, titania, magnesia, silica, or activated carbon and the like.

The various types of alumina that can be used in the process of this invention include the various adsorptive aluminas, e. g., calcined bauxite, calcined precipitated alumina trihydrate, calcined alumina gel prepared by hydrolysis of an aluminum alcoholate or commercial activated aluminas such as Alorco F–10 and Alorco H–41. The calcined forms of alumina may be the monohydrate, gamma, delta, eta, theta, or beta Al₂O₃, or other structural forms which have a surface area of 25 square meters per gram or higher.

It is pointed out that the present invention is not limited to the regeneration of platinum group metal catalysts, but includes the regeneration of hydrogenation/dehydrogenation catalysts generally such as, for instance, Ni, Pd, Ru, and similar catalysts.

The reactivated platinum type catalysts of this invention are adapted for use in hydroforming, hydrogenation, oxidation, and other reactions known to those in the art.

It is to be understood that this invention is not limited to the specific examples, which have been offered merely as illustrations, and that modifications may be made without departing from the spirit of the invention.

What is claimed is:

1. The method of reactivating a hydroforming, porous alumina supported, metallic platinum-containing catalyst which has become deactivated during a hydroforming operation, said alumina having a surface area of at least 25 sq. meters per gram, which comprises the steps of treating the supported catalyst with nitric acid; subjecting the thus-treated catalyst to the action of an aqueous hydrogen halide acid at a maximum temperature of about 200° F.; drying the supported catalyst; and reducing the supported catalyst.

2. The process of claim 1 in which the hydrogen halide acid is hydrochloric acid.

3. The method of reactivating a hydroforming, porous, alumina supported, metallic platinum containing catalyst which has become deactivated during a hydroforming operation, said alumina having a surface area of at least 25 sq. meters per gram, which comprises the steps of treating the supported catalyst with an aqueous solution of about 5.6 M nitric acid and 4.2 M hydrochloric acid, about 7 ml. of the aqueous solution being utilized per gram of supported catalyst, at a maximum temperature of about 200° F.; drying the supported catalyst; and reducing the supported catalyst.

References Cited in the file of this patent

UNITED STATES PATENTS

| 1,047,236 | Kelsey | Dec. 17, 1912 |
| 2,006,221 | Ridler | June 25, 1935 |
| 2,344,208 | Kirkpatrick | Mar. 14, 1944 |